United States Patent Office 2,726,247
Patented Dec. 6, 1955

2,726,247

2-AMINO-4-TRIFLUOROMETHYLTHIAZOLE COMPOUNDS AND PROCESS FOR THEIR PREPARATION

Edmund B. Towne and Hubert M. Hill, Kingsport, Tenn., assignors to Eastman Kodak Company, Rochester, N. Y., a corporation of New Jersey No Drawing. Application November 30, 1953, Serial No. 395,254

9 Claims. (Cl. 260—306.8)

This invention relates to certain 2-amino-4-trifluoromethylthiazole compounds and to a process for their preparation.

The new 2-amino-4-trifluoromethylthiazole compounds of our invention have the formula:

I 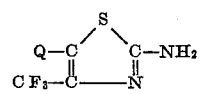

wherein Q represents a hydrogen atom or a carbalkoxy group. When Q is a carbalkoxy group it is ordinarily a carbalkoxy group containing 2 to 5, inclusive, carbon atoms.

The new thiazole compounds of our invention, as fully shown hereinafter, are valuable intermediates for the preparation of azo dye compounds useful for coloring various textile materials, especially cellulose acetate textile materials. The new thiazole compounds also possess interesting possibilities in the pharmaceutical field because sulfathiazole compounds are readily prepared therefrom. Thus the trifluoromethylsulfathiazole compounds having the general formula:

II 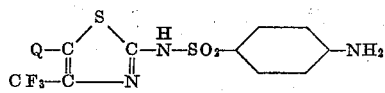

wherein Q has the meaning previously assigned to it are readily prepared. Further, the new 2-amino-4-trifluoromethylthiazole compounds may have direct utility as medicinals, such as, for example, the control of Blackhead disease in turkeys.

It is an object of our invention to provide new aminotrifluoromethylthiazole compounds. Another object is to provide a satisfactory process for the preparation of the new aminotrifluoromethylsulfathiazole compounds. A further object is to prepare light and gas fast azo dye compounds from the new aminotrifluoromethylthiazole compounds of our invention. A still further object is to provide dyed cellulose acetate textile materials which have good fastness to light and gas.

2 - amino - 4 - trifluoromethylthiazole, 2 - amino - 4 - trifluoromethyl - 5 - carbomethoxythiazole, 2 - amino - 4 - trifluoromethyl - 5 - carbethoxythiazole, 2 - amino - 4 - trifluoromethyl - 5 - carbisopropoxythiazole, 2 - amino - 4 - trifluoromethyl - 5 - carbo - n - propoxythiazole, 2 - amino - 4 - trifluoromethyl - 5 - carbo - n - butoxythiazole, 2 - amino - 4 - trifluoromethyl - 5 - carbo - n - amyloxythiazole and 2 - amino - 4 - trifluoromethyl - 5 - carbo - n - hexyloxythiazole are illustrative of the new thiazole compounds of our invention. The invention will be illustrated primarily with reference to 2 - amino - 4 - trifluoromethylthiazole and 2 - amino - 4 - trifluoromethyl - 5 - carbethoxythiazole.

2-amino-4-trifluoromethylthiazole is prepared in accordance with the process of our invention by reacting 1-chloro-3,3,3-trifluoropropanone-2

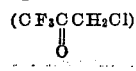

with thiourea. The 2-amino-4-trifluoromethyl-5-carbalkoxythiazole compounds are prepared in accordance with the process of our invention by reacting an alkyl ester of 2-chloro-4,4,4-trifluorobutanone-3 acid with thiourea. The ethyl ester of 2-chloro-4,4,4-trifluorobutanone-3 acid has the formula

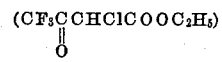

This compound can also be named ethyl-2-chloro-4,4,4-trifluoroacetoacetate. As seen from the foregoing, the alkyl esters of 2-chloro-4,4,4-trifluorobutanone-3 acid have the general formula

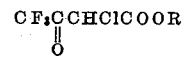

wherein R stands for an alkyl group.

Azo compounds that can be prepared from the 2-amino-4-trifluoromethylthiazole compounds of our invention include those having the general formula:

III 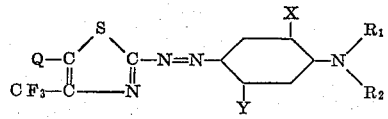

wherein Q represents a hydrogen atom or a carbalkoxy group, R₁ represents an alkyl group having 1 to 4, inclusive, carbon atoms, a hydroxyalkyl group having 2 to 4, inclusive, carbon atoms, an alkoxyalkyl group having 3 to 4, inclusive, carbon atoms, a β-cyanoethyl group, a —CH₂CH₂COOCH₃ group, a —CH₂CH₂COOC₂H₅ group, a 2,2-difluoroethyl group, a 2,2-difluoro-n-propyl group, a 3,3-difluoropropyl group, a 3,3-difluoro-n-butyl group, a 2,2,2-trifluoroethyl group or a 3,3,3-trifluoropropyl group, R₂ represents a hydroxyalkyl group having 2 to 4, inclusive, carbon atoms or an acetoxyethyl group, X represents a hydrogen atom or an alkoxy group having 1 to 2, inclusive, carbon atoms and Y represents a hydrogen atom, a methyl group, a chlorine atom, a bromine atom, an alkoxy group having 1 to 2, inclusive, carbon atoms, an acetylamino group, a propionylamino group or a butyrylamino group.

The azo compounds having the formula numbered III are useful for coloring textile materials made of or containing a cellulose carboxylic acid ester having two to four carbon atoms in the acid groups thereof. They are especially of use for the coloration of cellulose acetate textile materials. When applied to the aforesaid textile materials, they give, for example, red, reddish-violet, violet, orange and orange-red dyeings which, for the most part, have good fastness to both light and gas. These azo compounds also color wool, silk, nylon, polyethylene terephthalate and modified polyacrylonitrile textile materials similar colors.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The azo compounds having the formula numbered III are prepared by diazotizing 2-amino-4-trifluoromethylthiazole or a 2-amino-4-trifluoromethyl-5-carbalkoxythiazole and coupling the diazonium compound obtained with a compound having the formula:

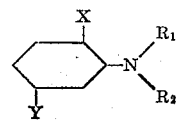

wherein R₁, R₂, X and Y have the meaning previously assigned to them.

Illustrative of the alkyl groups represented by R₁ are the methyl, the ethyl, the n-propyl, the isopropyl and the n-butyl groups. Similarly the β-hydroxyethyl, the β-hydroxypropyl, the γ-hydroxypropyl, the β,γ-dihydroxypropyl, the β-methyl-β,γ-dihydroxypropyl, the γ-methoxy-β-hydroxypropyl and the δ-hydroxybutyl groups are illustrative of the hydroxyalkyl groups $R_1$ and $R_2$ represent.

The following examples illustrate the compounds of our invention and their manner of preparation:

*Example 1.—Preparation of 2-amino-4-trifluoromethylthiazole*

14 grams of 1-chloro-3,3,3-trifluoropropanone-2 and 7.26 grams of thiourea in 50 cc. of water were heated together on a steam bath for four hours. After cooling, the reaction mixture was made slightly basic with sodium carbonate. A yellow precipitate of 2-amino-4-trifluoromethylthiazole formed and was recovered by filtration and dried. 9.1 grams of product melting at 58° C.–60° C. were obtained.

Analysis: Calculated for $C_4H_3F_3N_2S$—C, 28.57; H, 1.79; N, 16.67; S, 19.07. Found: C, 29.22; H, 1.95; N, 16.70; S, 19.28.

*Example 2.—Preparation of 2-amino-4-trifluoromethyl-5-carbethoxythiazole*

9.6 grams of the ethyl ester of 2-chloro-4,4,4-trifluorobutanone-3 acid and 3.34 grams of thiourea in 25 cc. of ethyl alcohol were refluxed together for four hours and then the ethyl alcohol present in the reaction mixture was removed by distilling under a vacuum. Following this, 75 cc. of water were added and the reaction mixture was filtered. The solid collected on the filter was suspended in water and sufficient ammonium hydroxide was added to make the reaction mixture slightly basic. The solid present in the reaction mixture was recovered by filtration and dried in an oven. 7.9 grams of 2-amino-4-trifluoromethyl-5-carbethoxythiazole melting at 168° C.–170° C. were thus obtained.

Analysis: Calculated for $C_7H_7F_3N_2O_2S$—C, 35.00; H, 2.94; N, 11.67; S, 13.35. Found: C, 35.06; H, 2.99; N, 11.65; S, 13.50.

*Example 3.—Preparation of 2-amino-4-trifluoromethyl-5-carbomethoxythiazole*

By the use of 8.98 grams of the methyl ester of 2-chloro-4,4,4-trifluorobutanone-3 acid in Example 2 in place of the ethyl ester of 2-chloro-4,4,4-trifluorobutanone-3 acid, 2-amino-4-trifluoromethyl-5-carbomethoxythiazole is obtained.

*Example 4.—Preparation of 2-amino-4-trifluoromethyl-5-carbisopropoxythiazole*

By the use of 10.2 grams of the isopropyl ester of 2-chloro-4,4,4-trifluorobutanone-3 acid in Example 2 in place of the ethyl ester of 2-chloro-4,4,4-trifluorobutanone-3 acid, 2-amino-4-trifluoromethyl-5-carbisopropoxythiazole is obtained.

*Example 5.—Preparation of 2-amino-4-trifluoromethyl-5-carbo-n-butoxythiazole*

By the use of 10.85 grams of the n-butyl ester of 2-chloro-4,4,4-trifluorobutanone-3 acid in Example 2 in place of the ethyl ester of 2-chloro-4,4,4-trifluorobutanone-3 acid, 2-amino-4-trifluoromethyl-5-carbo-n-butoxythiazole is obtained.

*Example 6.—Preparation of 2-amino-4-trifluoromethyl-5-carbo-n-hexyloxythiazole*

By the use of 12.15 grams of the n-hexyl ester of 2-chloro-4,4,4-trifluorobutanone-3 acid in Example 2 in place of the ethyl ester of 2-chloro-4,4,4-trifluorobutanone-3 acid, 2-amino-4-trifluoromethyl-5-carbo-n-hexyloxythiazole is obtained.

*Example 7*

A. PREPARATION OF NITROSYL SULFURIC ACID 1.52 grams of sodium nitrite were added portionwise to 10 cc. of concentrated sulfuric acid, with stirring, and the temperature of the reaction mixture was allowed to rise to 65° C. The resulting solution was then cooled to 5° C. and 20 cc. of a mixture consisting of 3 cc. of propionic acid and 17 cc. of acetic acid were added dropwise, with stirring, while allowing the temperature to rise to 15° C. and maintaining it at this temperature during the remainder of the addition.

B. DIAZOTIZATION

The nitrosyl sulfuric acid mixture prepared as described above was cooled to 0° C.–5° C. and then 4.80 grams of 2 - amino - 4 - trifluoromethyl - 5 - carbethoxythiazole were added portionwise, while stirring, after which 20 cc. of a propionic-acetic acid mixture prepared as described above were added while keeping the temperature of the reaction mixture at 0° C.–5° C. The reaction mixture thus obtained was then stirred at 0° C.–5° C. for two hours and excess sodium nitrite present was destroyed by adding one gram of urea. A clear diazonium solution was obtained.

C. COUPLING 10 cc. (0.004 mole) of a 2-amino-4-trifluoromethyl-5-carbethoxythiazole diazonium solution prepared as described in B above were added, with stirring, at 0° C.–5° C. to a solution of 0.89 gram of N-ethyl-N-β-methyl-β,γ-dihydroxypropyl-m-toluidine in 10 cc. of a 1:6 mixture of propionic-acetic acid (i. e. 1 part by volume of propionic acid to 6 parts by volume of acetic acid) cooled in an ice bath. After a short time, the reaction mixture was made neutral to Congo paper by adding sodium acetate portionwise and the coupling reaction was allowed to proceed for 20–30 minutes, after which the reaction mixture was poured into ice water. After stirring a short time, the reaction mixture was filtered to recover the dye compound formed on the filter. The dye compound thus obtained was washed well with water and dried. 1.3 gram of the dye compound having the formula:

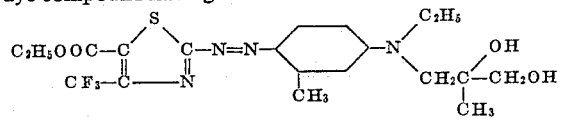

were obtained. This compound has excellent affinity for cellulose acetate textile materials and colors them deep, bright reddish-violet shades having excellent fastness to light and gas. A discharge print was sharp and white.

*Example 8*

10 cc. of a 2-amino-4-trifluoromethyl-5-carbethoxythiazole diazonium solution prepared as described in B of Example 7 were coupled at 0° C.–3° C. with a solution of 0.90 gram of N,N-di-β-hydroxyethyl-2-methoxy-5-chloroaniline in 10 cc. of a 1:6 mixture of propionic-acetic acid. Coupling and recovery of the dye compound formed were carried out in accordance with the general procedure described in Example 7. 1.25 grams of a compound which dyes cellulose acetate textile materials deep violet shades that have excellent fastness to light and gas were obtained.

*Example 9*

10 cc. of a 2-amino-4-trifluoromethyl-5-carbethoxythiazole diazonium solution prepared as described in Example 7 were coupled with a solution of 0.96 gram of N - β,γ - dihydroxypropyl - N - β - methoxyethyl - m-toluidine. Coupling and recovery of the dye compound formed were carried out in accordance with the general procedure described in Example 7. 1.37 grams of a compound which colors cellulose acetate textile materials bright red-violet shades having excellent fastness to gas and outstanding fastness to light were obtained as a dark powder.

*Example 10*

10 cc. of a 2-amino-4-trifluoromethyl-5-carbethoxythiazole diazonium solution prepared as described in Example 7 were coupled with a solution of 0.78 gram of N,N-di-β-hydroxyethyl-m-toluidine in 10 cc. of a 1:6 mixture of propionic-acetic acid. Coupling and recovery of the dye compound formed were carried out in accordance with the general procedure described in Example 7. The dye compound obtained colors cellulose acetate textile materials red-violet shades having good fastness to light and gas.

*Example 11*

10 cc. of a 2-amino-4-trifluoromethyl-5-carbethoxy-thiazole diazonium solution prepared as described in Example 7 were coupled with a solution of 0.84 gram of N-ethyl-N-β,γ-dihydroxypropyl-m-toluidine in 10 cc. of a 1:6 mixture of propionic-acetic acid. Coupling and recovery of the dye compound formed were carried out in accordance with the procedure described in Example 7. The dye compound obtained colors cellulose acetate textile materials red-violet shades having good fastness to light and gas.

*Example 12*

10 cc. of a 2-amino-4-trifluoromethyl-5-carbethoxy-thiazole diazonium solution prepared as described in Example 7 were coupled with a solution of 0.86 gram of N-β-hydroxyethyl-N-2,2-difluoroethyl-m-toluidine in 10 cc. of a 1:6 mixture of propionic-acetic acid. Coupling and recovery of the dye compound formed were carried out in accordance with the procedure described in Example 7. The dye compound obtained colors cellulose acetate textile materials reddish-pink shades having good fastness to light and gas.

By the use of 0.92 gram of N-2,2-difluoro-n-propyl-N-β-hydroxypropylaniline in the above example, a dye compound is obtained which colors cellulose acetate textile materials reddish-pink shades which have good fastness to light and gas.

*Example 13*

10 cc. of a 2-amino-4-trifluoromethyl-5-carbethoxy-thiazole diazonium solution prepared in accordance with the procedure described in Example 7 were coupled with a solution of 0.94 gram of N-n-propyl-N-γ-methoxy-β-hydroxypropyl-m-toluidine in 10 cc. of a 1:6 mixture of propionic-acetic acid. Coupling and recovery of the dye compound formed were carried out in accordance with the procedure described in Example 7. 1.5 grams of a dye which colors cellulose acetate textile materials bright red-violet shades having good fastness to light and gas and which discharge well were obtained.

*Example 14*

10 cc. of a 2-amino-4-trifluoromethyl-5-carbethoxy-thiazole diazonium solution prepared as described in Example 7 were coupled with a solution of 0.98 gram of N-β-hydroxyethyl-N-3,3,3-trifluoropropyl-m-toluidine in 10 cc. of a 1:6 mixture of propionic-acetic acid. Coupling and recovery of the dye compound formed were carried out in accordance with the procedure described in Example 7. 1.67 grams of a dye compound which colors cellulose acetate textile materials very bright, deep pinkish-red shades that have exceptional light fastness and good fastness to gas were obtained. The dyeings are also characterized in that they discharge to sharp, clear white prints.

*Example 15*

3.36 grams (0.02 mole) of 2-amino-4-trifluoromethyl-thiazole were diazotized in a nitrosyl sulfuric acid, propionic-acetic acid mixture in accordance with the procedure described in Example 7. 10 cc. of the 2-amino-4-trifluoromethylthiazole diazonium solution prepared as described above were coupled at 0° C.–3° C. with a solution of 0.78 gram of N,N-di-β-hydroxyethyl-m-toluidine in 10 cc. of a 1:6 mixture of propionic-acetic acid. Coupling and recovery of the dye compound formed were carried out in accordance with the general procedure described in Example 7. 1.1 grams of a dye which colors cellulose acetate textile materials bright violet-red shades having good fastness to light and gas were obtained.

*Example 16*

10 cc. of a 2-amino-4-trifluoromethylthiazole diazonium solution prepared as described in Example 15 were coupled with a solution of 0.84 gram of N-ethyl-N-β,γ-dihydroxypropyl-m-toluidine in 10 cc. of a 1:6 mixture of propionic-acetic acid. Coupling and recovery of the dye compound formed were carried out in accordance with the general procedure described in Example 7. 1.13 grams of a dye which colors cellulose acetate textile materials bright violet-red shades which have good fastness to light and gas were obtained.

*Example 17*

10 cc. of a 2-amino-4-trifluoromethylthiazole diazonium solution prepared as described in Example 15 were coupled with a solution of 0.81 gram of N-β-hydroxyethyl-N-2,2-difluoroethylaniline in 10 cc. of a 1:6 mixture of propionic-acetic acid. Coupling and recovery of the dye compound formed were carried out in accordance with the procedure described in Example 7. 1.22 grams of a dye which colors cellulose acetate textile materials deep orange-red shades having excellent fastness to light and gas were obtained.

*Example 18*

10 cc. of a 2-amino-4-trifluoromethyl-5-carbethoxy-thiazole diazonium solution prepared as described in Example 7 were coupled with a solution of 0.88 gram of N-β,γ-dihydroxypropyl-7-methyltetrahydroquinoline in 10 cc. of a 1:6 mixture of propionic-acetic acid. Coupling and recovery of the dye compound formed were carried out in accordance with the procedure described in Example 7. 1.13 grams of a dye compound having the formula:

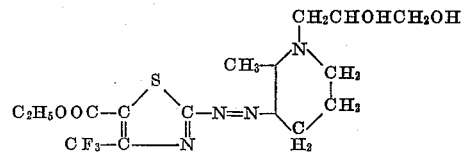

were obtained. It colors cellulose acetate textile materials bright violet shades which have good fastness to light and gas.

*Example 19*

10 cc. of a 2-amino-4-trifluoromethylthiazole diazonium solution prepared as described in Example 15 were coupled with a solution of 0.90 gram of N-β,γ-dihydroxypropyl-7-methylbenzomorpholine in 10 cc. of a 1:6 mixture of propionic acetic acid. Coupling and recovery of the dye compound formed were carried out in accordance with the procedure described in Example 7. The dye compound obtained has the formula:

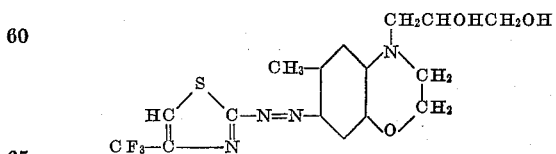

It colors cellulose acetate textile materials rubine shades which have good fastness to light and gas.

The compounds tabulated hereinafter further illustrate the azo compounds that can be prepared from the 2-amino-4-trifluoromethylthiazole compounds of our invention. These compounds are prepared by diazotizing the diazo components named hereinafter and coupling the diazonium compounds obtained with the coupling components named hereinafter. The color given is that which the compounds color cellulose acetate. The diazotization, coupling and recovery operations are carried out in accordance with the procedure described hereinbefore.

TABLE I
[Diazo component: 2-amino-4-trifluoromethylthiazole.]

| Coupling Component | Color |
|---|---|
| 1. N,N-di-β-hydroxyethyl-m-acetylaminoaniline | red. |
| 2. N,N-di-β-hydroxyethyl-2-methoxy-5-acetylaminoaniline | Do. |
| 3. N,N-di-β-hydroxyethyl-2-methoxy-5-methylanaline | Do. |
| 4. N,N-di-β-hydroxyethyl-2,5-dimethoxyaniline | Do. |
| 5. N,N-di-β-hydroxyethyl-2,5-diethoxyaniline | Do. |
| 6. N-β-methoxyethyl-N-β-methyl-β,γ-dihydroxypropyl-m-toluidine. | Do. |
| 7. N-β-ethoxyethyl-N-β-hydroxyethylaniline | Do. |
| 8. N-CH²CH²COOCH³-N-β,γ-dihydroxypropyl-m-toluidine. | Do. |
| 9. N-β,γ-dihydroxypropyl-N-β-acetoxyethylaniline | Do. |
| 10. N-β-hydroxyethyl-N-δ-hydroxybutylaniline | Do. |
| 11. N-β-hydroxyethyl-N-β,γ-dihydroxypropyl-m-toluidine. | Do. |
| 12. N-ethyl-N-β-acetoxyethyl-m-toluidine | Do. |
| 13. N-n-propyl-N-β-hydroxyethyl-m-toluidine | Do. |
| 14. N-n-propyl-N-β,γ-dihydroxypropyl-m-toluidine | Do. |
| 15. N-n-propyl-N-β-methyl-β,γ-dihydroxypropyl-m-toluidine. | Do. |
| 16. N-ethyl-N-β-acetoxyethylaniline | Do. |
| 17. N-β,γ-dihydroxypropyl-N-3,3-difluoro-n-butyl-m-toluidine. | orange-red. |
| 18. N-β-hydroxyethyl-N-2,2,2-trifluoroethyl-m-toluidine | orange. |
| 19. N-β-hydroxyethyl-N-2,2-difluoro-n-propylaniline | Do. |
| 20. N-β-hydroxyethyl-N-3,3-difluoropropyl-m-toluidine | Do. |
| 21. N-β-hydroxyethyl-N-2,2-difluoro-n-propylaniline | Do. |
| 22. N-β-hydroxyethyl-N-3,3-difluoro-n-butylaniline | Do. |
| 23. N-β-hydroxyethyl-N-β-cyanoethyl-m-toluidine | Do. |
| 24. N-n-butyl-N-β,γ-dihydroxypropyl-m-toluidine | red. |
| 25. N-β-hydroxypropyl-N-β-hydroxyethylaniline | Do. |
| 26. N-methyl-N-n-propylaniline | Do. |
| 27. N-CH₂CH₂COOC₂H₅-N-β-hydroxyethylaniline | orange. |
| 28. N,N-di-β-hydroxypropylaniline | red. |
| 29. N,N-di-β-hydroxyethyl-m-chloroaniline | Do. |
| 30. N,N-di-β-hydroxyethyl-m-bromoaniline | Do. |
| 31. N,N-di-β-hydroxyethyl-m-n-propionylamino-aniline | rubine. |
| 32. N,N-di-β-hydroxyethyl-m-n-butyrylaminoaniline | Do. |
| 33. N-β,γ-dihydroxypropyl-2,7-dimethyltetrahydroquinoline. | Do. |
| 34. N-β-hydroxyethyl-2-methyltetrahydroquinoline | Do. |
| 35. N-β,γ-dihydroxypropyl-2,5-dimethylbenzomorpholine | Do. |

TABLE II
[Diazo component: 2-amino-4-trifluoromethyl-5-carbethoxythiazole.]

| Coupling Component | Color |
|---|---|
| 1. N,N-di-β-hydroxyethyl-m-acetylaminoaniline | red-violet. |
| 2. N,N-di-β-hydroxyethyl-2-methoxy-5-acetylaminoaniline | Do. |
| 3. N,N-di-β-hydroxyethyl-2-methoxy-5-methylaniline | Do. |
| 4. N,N-di-β-hydroxyethyl-2,5-dimethoxyaniline | Do. |
| 5. N,N-di-β-hydroxyethyl-2,5-diethoxyaniline | Do. |
| 6. N-β-methoxyethyl-N-β-methyl-β,γ-dihydroxypropyl-m-toluidine. | Do. |
| 7. N-β-ethoxyethyl-N-β-hydroxyethylaniline | Do. |
| 8. N-CH²CH²COOCH³-N-β,γ-dihydroxypropyl-m-toluidine. | rubine. |
| 9. N-β,γ-dihydroxypropyl-N-β-acetoxyethylaniline | Do. |
| 10. N-β-hydroxyethyl-N-δ-hydroxybutylaniline | red-violet. |
| 11. N-β-hydroxyethyl-N-β,γ-dihydroxypropyl-m-toluidine. | Do. |
| 12. N-ethyl-N-β-acetoxyethyl-m-toluidine | Do. |
| 13. N-n-propyl-N-β-hydroxyethyl-m-toluidine | Do. |
| 14. N-n-propyl-N-β,γ-dihydroxypropyl-m-toluidine | Do. |
| 15. N-n-propyl-N-β-methyl-β,γ-dihydroxypropyl-m-toluidine. | Do. |
| 16. N-ethyl-N-β-acetoxyethylaniline | Do. |
| 17. N-β,γ-dihydroxypropyl-N-3,3-difluoro-n-butyl-m-toluidine. | pinkish-red. |
| 18. N-β-hydroxyethyl-N-2,2,2-trifluoroethyl-m-toluidine | orange-red. |
| 19. N-β-hydroxyethyl-N-2,2-difluoro-n-propylaniline | Do. |
| 20. N-β-hydroxyethyl-N-3,3-difluoropropyl-m-toluidine | Do. |
| 21. N-β-hydroxyethyl-N-2,2-difluoro-n-propylaniline | Do. |
| 22. N-β-hydroxyethyl-N-3,3-difluoro-n-butylaniline | Do. |
| 23. N-β-hydroxyethyl-N-β-cyanoethyl-m-toluidine | Do. |
| 24. N-n-butyl-N-β,γ-dihydroxypropyl-m-toluidine | red-violet. |
| 25. N-β-hydroxypropyl-N-β-hydroxyethylaniline | Do. |
| 26. N-methyl-N-n-propylaniline | Do. |
| 27. N-CH₂CH₂COOC₂H₅-N-β-hydroxyethylaniline | orange-red. |
| 28. N,N-di-β-hydroxypropylaniline | rubine. |
| 29. N,N-di-β-hydroxyethyl-m-chloroaniline | Do. |
| 30. N,N-di-β-hydroxyethyl-m-bromoaniline | Do. |
| 31. N,N-di-β-hydroxyethyl-m-n-propionylaminoaniline | red-violet. |
| 32. N,N-di-β-hydroxyethyl-m-n-butyrylaminoaniline | Do. |
| 33. N-β,γ-dihydroxypropyl-2,7-dimethyltetrahydroquinoline. | violet. |
| 34. N-β-hydroxyethyl-2-methyltetrahydroquinoline | Do. |
| 35. N-β,γ-dihydroxypropyl-2,5-dimethylbenzomorpholine. | Do. |

TABLE III
[Diazo component: 2-amino-4-trifluoromethyl-5-carbomethoxythiazole.]

| Coupling Component | Color |
|---|---|
| 1. N,N-di-β-hydroxyethylaniline | red-violet. |
| 2. N,N-di-β-hydroxyethyl-m-toluidine | Do. |
| 3. N-β-hydroxyethyl-N-2,2-difluoroethyl-m-toluidine | pinkish-red. |
| 4. N-β-hydroxyethyl-N-2,2,2-trifluoroethylaniline | orange-red. |
| 5. N-ethyl-N-β,γ-dihydroxypropyl-m-toluidine | red-violet. |
| 6. N-β,γ-dihydroxypropyl-2,7-dimethyltetrahydroquinoline. | violet. |
| 7. N-β-hydroxyethyl-2-methyltetrahydroquinoline | Do. |
| 8. N-β,γ-dihydroxypropyl-2,5-dimethylbenzomorpholine. | Do. |

TABLE IV
[Diazo component: 2-amino-4-trifluoromethyl-5-carbisopropoxythiazole.]

| Coupling Component | Color |
|---|---|
| 1. N,N-di-β-hydroxyethylaniline | red-violet. |
| 2. N,N-di-β-hydroxyethyl-m-toluidine | Do. |
| 3. N-β-hydroxyethyl-N-2,2-difluoroethyl-m-toluidine | pinkish-red. |
| 4. N-β-hydroxyethyl-N-2,2,2-trifluoroethylaniline | orange-red. |
| 5. N-ethyl-N-β,γ-dihydroxypropyl-m-toluidine | red-violet. |
| 6. N-β,γ-dihydroxypropyl-2,7-dimethyltetrahydroquinoline. | violet. |
| 7. N-β-hydroxyethyl-2-methyltetrahydroquinoline | Do. |
| 8. N-β,γ-dihydroxypropyl-2,5-dimethylbenzomorpholine. | Do. |

TABLE V
[Diazo component: 2-amino-4-trifluoromethyl-5-carbo-n-butoxythiazole.]

| Coupling Component | Color |
|---|---|
| 1. N,N-di-β-hydroxyethylaniline | red-violet. |
| 2. N,N-di-β-hydroxyethyl-m-toluidine | Do. |
| 3. N-β-hydroxyethyl-N-2,2-difluoroethyl-m-toluidine | pinkish-red. |
| 4. N-β-hydroxyethyl-N-2,2,2-trifluoroethylaniline | orange-red. |
| 5. N-ethyl-N-β,γ-dihydroxypropyl-m-toluidine | red-violet. |
| 6. N-β,γ-dihydroxypropyl-2,7-dimethyltetrahydroquinoline. | violet. |
| 7. N-β-hydroxyethyl-2-methyltetrahydroquinoline | Do. |
| 8. N-β,γ-dihydroxypropyl-2,5-dimethylbenzomorpholine. | Do. |

TABLE VI
[Diazo component: 2-amino-4-trifluoromethyl-5-carbo-n-hexyloxythiazole.]

| Coupling Component | Color |
|---|---|
| 1. N,N-di-β-hydroxyethylaniline | red-violet. |
| 2. N,N-di-β-hydroxyethyl-m-toluidine | Do. |
| 3. N-β-hydroxyethyl-N-2,2-difluoroethyl-m-toluidine | pinkish-red. |
| 4. N-β-hydroxyethyl-N-2,2,2-trifluoroethylaniline | orange-red. |
| 5. N-ethyl-N-β,γ-dihydroxypropyl-m-toluidine | red-violet. |
| 6. N-β,γ-dihydroxypropyl-2,7-dimethyltetrahydroquinoline. | violet. |
| 7. N-β-hydroxyethyl-2-methyltetrahydroquinoline | Do. |
| 8. N-β,γ-dihydroxypropyl-2,5-dimethylbenzomorpholine. | Do. |

The 2-sulfanilamido-4-trifluoromethylthiazole compounds having the general formula numbered II are prepared by reacting a 2-amino-4-trifluoromethylthiazole compound having the formula numbered I with p-acetamido-benzenesulfonyl chloride to obtain the corresponding 2-(p-N-acetylbenzenesulfonyl)amino-4-trifluoromethylthiazole compound which is hydrolyzed to the 2-sulfanilamido-4-trifluoromethylthiazole compound. The term "sulfanilamido" as used herein refers to the

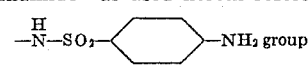

Example 20

A mixture of 16.8 g. (0.1 m.) of 2-amino-4-trifluoromethylthiazole, 22.2 g. (0.1 m.) of p-nitrobenzenesulfonyl chloride, 50 ml. of chloroform, and 50 ml. of water containing 4 g. of sodium hydroxide was shaken at room temperature for 12 hours. The chloroform layer was separated and washed once with sodium hydroxide solution and dried. Removal of the chloroform yielded a yellow crystalline compound. Hydrogenation of this compound at room temperature in ethanol over Adams' catalyst yielded 24.3 g. of 2-sulfanilamido-4-trifluoromethylthiazole.

Example 21

A mixture of 24 g. (0.1 m.) of 2-amino-5-carbethoxy-4-trifluoromethylthiazole, 22.2 g. (0.1 m.) of p-nitrobenzenesulfonyl chloride, 50 ml. of chloroform and 50 ml. of water containing 5.3 g. of anhydrous sodium carbonate was shaken for 8 hours. The chloroform layer was separated, dried and the chloroform removed. Hydrogenation of the residue over Adams' catalyst in alcohol solution yielded 29.0 g. of 2-sulfanilamido-5-carboethoxy-4-trifluoromethylthiazole.

The azo dye compounds described herein can be applied to the textile materials named hereinbefore in the form of an aqueous dispersion and are ordinarily so applied. To illustrate, the dye compound is finely ground with a dispersing agent such as sodium lignin sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dyebath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dyebath, washed with an aqueous soap solution, rinsed well with water and dried.

Widely varying amounts of dye can be used in the dyeing operation. The amount of dye used can be, for example, ⅓ to 3% (by weight) of that of the textile material although lesser or greater amounts of dye can be employed.

This application is a continuation-in-part of our application Serial No. 304,838 filed August 16, 1952. It discloses all the subject matter disclosed in said application Serial No. 304,838 and contains additional subject matter.

We claim:

1. The 2-amino-4-trifluoromethylthiazole compounds having the formula

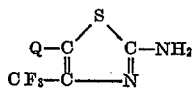

wherein Q represents a member selected from the group consisting of a hydrogen atom and a carbalkoxy group.

2. 2-amino-4-trifluoromethylthiazole.
3. 2-amino-4-trifluoromethyl-5-carbethoxythiazole.
4. 2-amino-4-trifluoromethyl-5-carbomethoxythiazole.
5. 2-amino-4-trifluoromethyl-5-carboisopropoxythiazole.
6. 2-amino-4-trifluoromethyl-5-carbo-n-butoxythiazole.
7. The process for preparing a 2-amino-4-trifluoromethylthiazole compound having the formula

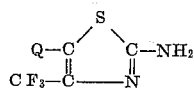

wherein Q represents a member selected from the group consisting of a hydrogen atom and a carbalkoxy group which comprises reacting a member selected from the group consisting of 1-chloro-3,3,3-trifluoropropanone-2 and an alkyl ester of 2-chloro-4,4,4-trifluorobutanone-3 acid with thiourea.

8. The process for preparing 2-amino-4-trifluoromethylthiazole which comprises reacting 1-chloro-3,3,3-trifluoropropanone-2 with thiourea.

9. The process for preparing 2-amino-4-trifluoromethyl-5-carbethoxythiazole which comprises reacting the ethyl ester of 2-chloro-4,4,4-trifluorobutanone-3 acid with thiourea.

References Cited in the file of this patent

UNITED STATES PATENTS

| | | |
|---|---|---|
| 2,519,325 | Sondern et al. | Aug. 15, 1950 |
| 2,537,592 | Kyrides et al. | Jan. 9, 1951 |
| 2,592,859 | Cleary | Apr. 15, 1952 |
| 2,600,620 | Crauland | June 17, 1952 |
| 2,659,719 | Dickey et al. | Nov. 17, 1953 |